United States Patent [19]
Dunay

[11] 3,775,213
[45] Nov. 27, 1973

[54] PRODUCTION OF LIGHTWEIGHT POLYBENZIMIDAZOLE INSULATIVE MATERIAL

[75] Inventor: Michael Dunay, Fanway, N.J.

[73] Assignee: Celanese Corporation, New York, N.Y.

[22] Filed: May 28, 1970

[21] Appl. No.: 41,410

[52] U.S. Cl.............. 156/244, 156/296, 156/305, 156/308, 156/314, 156/180, 156/167, 18/8 SC
[51] Int. Cl. ......................................... B29c 19/00
[58] Field of Search................. 156/166, 167, 219, 156/305, 306, 307, 244, 314, 180; 18/8 SC, 86, 8 QM, 8 QD; 28/73

[56] References Cited
UNITED STATES PATENTS

| | | | |
|---|---|---|---|
| 3,148,101 | 9/1964 | Allman, Jr. et al. | 156/306 X |
| 3,179,630 | 4/1965 | Endrey | 161/189 X |
| 3,271,220 | 9/1966 | Geen | 2/239 X |
| 3,352,734 | 11/1967 | McIntyre et al. | 156/305 X |
| 3,365,354 | 1/1968 | Britton | 156/305 X |
| 3,516,900 | 6/1970 | Mallonee et al. | 161/150 |
| 3,573,130 | 3/1971 | Vinton et al. | 156/305 X |
| 3,574,523 | 4/1971 | Hudson et al. | 161/150 X |

OTHER PUBLICATIONS
Polymer Resists Heat, Chem. and Eng. News, Vol. 38, No. 48, Nov. 28, 1960, p. 41.
New High Temperature Polymers: Ordered Heterocycle Copolymers, Preston et al., Amer. Chem. Soc., Div. Polymer Chem., Preprints, 757–765 (1965) (Eng.).

Primary Examiner—Carl D. Quarforth
Assistant Examiner—P. A. Nelson
Attorney—Thomas J. Morgan, Charles B. Barris and Kenneth E. Macklin

[57] ABSTRACT

A process is provided for forming a lightweight polybenzimidazole product which is both high temperature resistant and flameproof. A plurality of adjoining segments of hollow polybenzimidazole fiber are contacted with a solvent for the same, the solvent is evaporated thereby bonding the adjoining segments at locations where contact is made, and the resulting lightweight product is heated at an elevated temperature until volatile components present within the fibrous product are substantially removed. The resulting product is particularly useful as an insulative barrier in aerospace applications.

16 Claims, 1 Drawing Figure

PATENTED NOV 27 1973  3,775,213
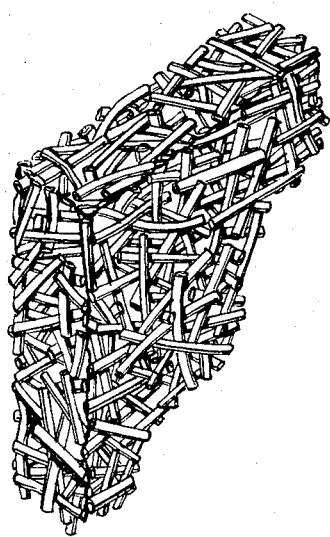
INVENTOR.
MICHAEL DUNAY

PRODUCTION OF LIGHTWEIGHT POLYBENZIMIDAZOLE INSULATIVE MATERIAL

BACKGROUND OF THE INVENTION

In recent years the search for lightweight heat resistant and flameproof insulating materials has been intensified because of demands for such products presented by the aerospace industry.

Those interested in the evaluation of the various insulative products which have been proposed are becoming increasingly aware of the importance of the "total fire hazard " concept. This concept takes into consideration whether the product is apt to evolve smoke or other toxic vapors when subjected to flame or elevated temperatures such as would be encountered upon the combustion of nearby flammable materials. For instance, it is generally recognized that in many use areas the potential evolution of toxic gases by an insulating material upon the application of heat may be a hazard at least as great as its potential flammability.

It is an object of the invention to provide a process for the production of a lightweight product which is particularly useful as an insulative barrier in aerospace applications.

It is another object of the invention to provide a lightweight product which is flameproof.

It is a further object of the invention to provide a lightweight product which is capable of withstanding elevated temperatures without the evolution of toxic gases.

These and other objects, as well as the scope, nature, and utilization of the invention will be apparent from the following detailed description, and appended claims.

SUMMARY OF THE INVENTION

It has been found that a process for forming a high temperature resistant product comprises:
a. providing a plurality of adjoining segments of hollow polybenzimidazole fiber,
b. contacting the adjoining segments of hollow polybenzimidazole fiber with a solvent for the polybenzimidazole in a quantity sufficient to solubilize a portion of the fiber surface while maintaining the original hollow fibrous configuration of the segments essentially intact,
c. evaporating a quantity of the solvent thereby bonding the adjoining segments of hollow polybenzimidazole fiber at points of contact, and
d. heating the resulting bonded product to a temperature of at least 400°C. where it is maintained until volatile components present therein are substantially removed.

The resulting lightweight product may be advantageously utilized as an insulative barrier in aerospace applications, as well as in other similar use areas.

DESCRIPTION OF THE DRAWING

The drawing illustrates a portion of an insulative panel formed in accordance with the present invention. The panel illustrated comprises a plurality of short segments of hollow polybenzimidazole fibers which are bonded together at their points of contact.

DESCRIPTION OF PREFERRED EMBODIMENTS

The polymeric material utilized to form the hollow fiber is a linear polybenzimidazole. Typical polymers of this class and their preparation are more fully described in U.S. Pat. No. 2,895,948, U.S. Reissue Pat. No. 26,065, and in the Journal of Polymer Science, Vol. 50, pages 511–539 (1961) which are herein incorporated by reference. The polybenzimidazoles consist essentially of recurring units of the following Formulas I and II. Formula I is:

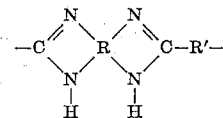

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having four to eight carbon atoms), and (3) a heterocyclic ring from the class consisting of (a) pyridine, (b) pyrazine, (c) furan, (d) quinoline, (e) thiophene, and (f) pyran. Formula II is:

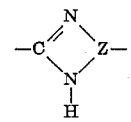

wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas I and II wherein R' is an aromatic ring or a heterocyclic ring.

As set forth in U.S. Reissue Pat. No. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'(m-phenylene)-5,5'-bibenzimidazole;
poly-2,2'-(pyridylene-3'''')-5,5'-bibenzimidazole;
poly-2,2'-(furylene-2'',5'')-5,5'-bibenzimidazole;
poly-2,2'-(naphthalene-1'',6'')-5,5'-bibenzimidazole;

poly-2,2'-(biphenylene-4'',4''')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene)-5,5'-di(benzimidazole) sulfone;
poly-2,2'(m-phenylene)-5,5'-di(benzimidazole) methane;
poly-2',2''(m-phenylene)-5',5''di(benzimidazole) propane-2,2; and
poly-2', 2''(m-phenylene)-5',5''di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

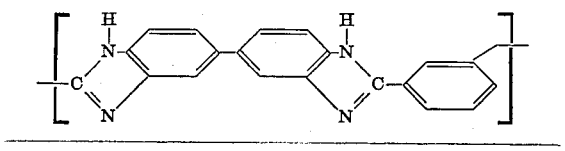

Any polymerization process known to those skilled in the art may be employed to prepare the polybenzimidazole. With respect to aromatic polybenzimidazoles, preferably, equimolar quantities of the monomeric tetraamine and dicarboxyl compound may be introduced into a first stage melt polymerization reaction zone and heated therein at a temperature above about 200°C., preferably at least 250°C., and more preferably from about 270° to 300°C. The reaction is conducted in a substantially oxygen-free atmosphere, i.e., below about 20 ppm oxygen and preferably below about 8 ppm oxygen, until a foamed prepolymer is formed. Usually, the first stage reaction is continued until a prepolymer is formed having an inherent viscosity, expressed as deciliters per gram, of at least 0.1, and preferably from about 0.13 to 0.3 (determined from a solution of 0.4 grams of the polymer in 100 ml. of 97 per cent $H_2SO_4$ at 25°C.).

After the conclusion of the first stage reaction, which normally takes at least 0.5 hour and preferably 1 to 3 hours, the foamed propolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, e.g., 0.8 to 1.1 or more. The temperature employed in the second stage is at least 250°C., preferably at least 325°C., and more preferably from about 350° to 425°C. The second stage reaction generally takes at least 0.5 hours, and preferably from about 1 to 4 hours or more.

Hollow polybenzimidazole fiber for use in the present process may be formed by any one of a variety of techniques as will be apparent to those skilled in the art. For instance, dry or wet spinning techniques may be utilized to form the hollow fiber utilizing an extrusion orifice of a suitable configuration to form a tubular fiber. Alternatively, the hollow fiber utilized in the present process may be formed in accordance with the teachings of commonly assigned U.S. Pat. No. 3,494,121 of Thomas C. Bohrer which is herein incorporated by reference.

In a preferred embodiment of the invention the hollow polybenzimidazole fiber is formed by (a) providing a spinning solution of a fiber-forming polybenzimidazole dissolved in a spinning solvent selected from the group consisting of N,N-dimethyl formamide, N,N-dimethyl acetamide, dimethyl sulfoxide, and N-methyl-2-pyrrolidone, (b) extruding the solution into a coagulation bath which is a non-solvent for the polybenzimidazole and capable of coagulating the periphery of the resulting polybenzimidazole fiber, (c) removing the resulting polybenzimidazole fiber from the coagulation bath following the coagulation of the periphery of the fiber while the fiber continues to maintain a substantial quantity of the solvent within the interior thereof, and (d) passing the fiber containing a substantial quantity of the solvent within the interior thereof through a heating zone capable of promoting the expansion thereof to form a hollow polybenzimidazole fiber.

The preferred spinning solvent for use in forming the spinning solution is N,N-dimethyl acetamide. The spinning solution may be prepared by dissolving sufficient polybenzimidazole in the solvent (i.e., N,N-dimethyl formamide, N,N-dimethyl acetamide, dimethyl sulfoxide, or N-methyl-2-pyrrolidone) to yield a final solution suitable for extrusion containing about 20 to 30 per cent by weight of polymer, based upon the total weight of the solution, and preferably from about 20 to 24 per cent by weight polymer. The viscosity of the spinning solution should be within the range of 500 to 8000 poises measured at 30°C., and preferably in the range of about 1,500 to 4,000 poises at 30°C.

One suitable means for dissolving the polymer in the solvent is by mixing the materials at a temperature above the normal boiling point of the solvent, for example, about 25° to 120°C. above such boiling point, and at a pressure of 2 to 15 atmospheres for a period of 1 to 5 hours. The resulting solutions are then filtered to remove any undissolved polymer which would otherwise clog the spinning orifice. A minor amount of lithium chloride optionally may be provided in the spinning solution in accordance with the teachings of commonly assigned U.S. Pat. No. 3,502,606 of Anthony B. Conciatori and Charles L. Smart which is herein incorporated by reference.

The spinning solution is extruded into a coagulation bath which is a non-solvent for the polybenzimidazole and capable of coagulating the periphery of the resulting fiber. While passing through the coagulation bath, an outer skin or layer of precipitated polymer is formed upon the surface of the resulting polybenzimidazole fiber. A substantial quantity of the polybenzimidazole spinning solvent is retained within the interior of the resulting fiber, and the interior of the resulting fiber is of a substantially lesser density than the coagulated periphery thereof.

Any coagulation bath capable of coagulating the fiber surface in a relatively rapid fashion may be selected for use in the process. Aqueous coagulation baths of N,N-dimethyl formamide, N,N-dimethyl acetamide, dimethyl sulfoxide or N-methyl-2-pyrrolidone may be selected. Such aqueous coagulation baths preferably contain the same solvent as employed in the spinning solution and at least about 50 per cent water by weight (e.g. about 50 to 65 per cent water by weight). The preferred coagulation bath for use in the process is tetrachloroethylene. Other illustrative coagulation baths include methylene chloride, ethylene dichloride, methyl chloroform, trichloroethylene, and aliphatic hydrocarbons such as hexane, cyclohexane, and heptane. The coagulation bath is preferably circulated and preferably flows in the same direction as the extruded fiber.

The temperature of the spinning solution during the extrusion step should be within the range of about 10°C. up to just below the boiling point of the spinning solvent. The temperature of the coagulation bath should be within the range of about 10°C. up to just below the boiling point of the coagulation bath. The spinning solution and the coagulation may be each conveniently provided at about room temperature (i.e. about 25°C.). Conventional circular extrusion orifices may be utilized. The resulting as-spun fibers commonly have a denier of about 10 to 200, or more. The residence time of the as-spun fiber within the coagulation bath should be such that the periphery of the fiber is coagulated while the interior thereof tends to be unprecipitated and continues to retain a substantial quantity of the spinning solvent. In a preferred embodiment of the invention the extruded fiber experiences a residence time of about 1 to 60 seconds within the coagulation bath. Extrusion speeds of 1 to 10 meters per minute, or more, may be selected.

The resulting polybenzimidazole fiber following its removal from the coagulation bath is next passed through a heating zone capable of promoting the expansion thereof to a hollow polybenzimidazole fiber. In a preferred embodiment of the invention the fiber following its removal from the coagulation bath is continuously passed in the direction of its length to the heating zone wherein the solvent present within the interior thereof causes the fiber to expand to a tubular configuration having a continuous hollow core. No intermediate wash step is recommended since the presence of a substantial quantity of solvent within the interior of the surface coagulated fiber is essential to bring about the expansion thereof to the desired hollow configuration.

The heating zone utilized to bring about the expansion of the surface coagulated fiber may be either a heated contact surface over which the fiber is continuously passed, or a heated gaseous atmosphere. In a preferred embodiment of the invention the heating zone comprises a hot shoe over which the surface coagulated fiber is passed while in contact with the same. The heating zone is preferably provided at a temperature ranging from the boiling point of the spinning solvent up to about 300°C. (e.g. 200 to 300°C.). In a particularly preferred embodiment of the process the heating zone is a heated contact surface provided at a temperature of about 200° to 225°C.

The residence time for the fiber within the heating zone is relatively brief and is adjusted so that the requisite expansion to form a tubular fiber occurs in the absence of appreciable thermally induced molecular cross-linking which renders the polybenzimidazole insoluble in many of its common solvents, such as N,N-dimethyl acetamide. Residence times within the heating zone commonly range from 1 to 60 seconds, and preferably from 10 to 60 seconds. If desired, the tensile properties of the resulting hollow fiber may be optionally enhanced by placing the same under a longitudinal tension sufficient to draw the same while passing through the heat treatment zone. Alternatively, such optional drawing may be conducted in a separate hot drawing zone as will be apparent to those skilled in the art in accordance with conventional fiber drawing techniques.

The hollow polybenzimidazole fiber regardless of the technique used in its formation is placed in the configuration desired for the final product of the present process. The fiber is positioned in such a manner that a plurality of adjoining segments of the hollow fiber are in contact. In a preferred embodiment of the invention the hollow polybenzimidazole fiber is provided as a random array of fiber segments having lengths of about 0.1 to 1 inch which are contained within a frame or support having a configuration identical to that of the desired product. Alternatively, such relatively short fiber segments may be provided in an oriented configuration. If desired, adjoining segments of the hollow fiber may be provided through the winding of a continuous length of the same upon a support.

The adjoining segments of hollow polybenzimidazole fiber are next contacted with a bonding solvent for the polybenzimidazole in a quantity sufficient to solubilize a portion of the fiber surface while maintaining their original hollow fibrous configuration essentially intact. The bonding solvent selected may be identical to the spinning solvent (i.e. N,N-dimethyl formamide, N,N-dimethyl acetamide, dimethyl sulfoxide, or N-methyl-2-pyrrolidone). Alternatively, the bonding solvent may be selected from other solvents which are commonly recognized in the art to be solvents for a polybenzimidazole. For instance, other illustrative bonding solvents include formic acid and sulfuric acid. Contact between the hollow polybenzimidazole fiber and bonding solvent may be conveniently accomplished by spraying the fiber with the bonding solvent so that the solvent impinges upon and coats the surface of the hollow fiber. Alternatively the bonding solvent may be allowed to briefly flow through an array or mat of the adjoining segments of hollow fiber wherein the fiber surface is coated with the bonding solvent.

In a further embodiment of the process a continuous length of the hollow polybenzimidazole fiber while wound upon a support may be briefly immersed in a vessel containing the bonding solvent wherein the fiber surface becomes coated upon its removal. The bonding solvent may optionally include a quantity of polybenzimidazole dissolved therein prior to its contact with the hollow fiber.

A quantity of the bonding solvent while in contact with the adjoining segments of hollow polybenzimidazole fiber is next evaporated to accomplish bonding of the fiber segments at their points of contact. Evaporation of the solvent is preferably largely conducted at a temperature ranging from the boiling point of the solvent up to about 100°C. in excess of the boiling point of the solvent (e.g. at about 200° to 300°C.).

As the solvent is evaporated, adhesion between adjoining fiber segments occurs.

By conducting the evaporation of the bonding solvent at or near its boiling point a permanent bond between adjoining fiber segments occurs without the violent evolution of bonding solvent or the rearrangement of adjoining fiber segments. If desired, the fiber while in contact with the bonding solvent may be heated at a constant temperature while evaporation occurs, or the temperature may be gradually elevated (e.g. from about 200° to 400°C.). Suitable times during which a quantity of the bonding solvent is evaporated to accomplish bonding of the hollow fiber segments commonly range from about 1 to 60 minutes. Longer bonding times may be employed but generally yield no commensurate advantage. The apparatus in which bonding is conducted may be varied, and may conveniently be a circulating air oven.

Following the bonding of adjoining fiber segments the bonded product is next heated at a temperature of at least 400°C. (e.g. 400° to 700°C.), and preferably at a temperature of at least 500°C. (e.g. 500° to 700°C.) where it is maintained until residual volatile components present therein are substantially removed. The final heating step of the process may be conducted for about 2 to 15 minutes, or more. During this final thermal treatment residual volatile components (e.g., residual spinning and bonding solvent) present therein are substantially evolved thereby eliminating the hazard presented by the possible volatilization of such components should the product ever be subjected to highly elevated temperatures during utilization. Also the final thermal treatment promotes cross-linking of molecules within the bonded polybenzimidazole product which renders the same insoluble in common polybenzimidazole solvents, such as N,N-dimethyl acetamide. The final heat treatment step is preferably conducted in an oxygen-containing atmosphere, such as ordinary air, wherein the cross-linking of molecules includes oxidative cross-linking.

The product of the present invention is black in appearance, lightweight, and high temperature resistant. The product is flameproof and will not burn when placed in the flame of a microburner.

The resulting high temperature resistant product is particularly useful as an insulative material which finds particular utility in the aerospace industry or in similar applications where its unique properites may be put to good use. For instance, self-supporting insulative panels may be formed. If desired, the product may be cut to various configurations required for specific end uses following its formation.

The following example is given as a specific illustration of the invention. It should be understood, however, that the invention is not limited to the specific details set forth in the example.

EXAMPLE

A spinning solution of a fiber-forming polybenzimidazole having a Brookfield low shear viscosity of 2,200 poises at 30°C. is prepared employing N,N-dimethyl acetamide as spinning solvent containing 24 per cent by weight of poly-2,2'-(m-phenylene)-5,5'-bibenzimidazole based upon the total weight of the solution, and 2 per cent by weight of lithium chloride based upon the total weight of the solution. The dissolution of the polymer is accomplished by agitating the same while in particulate form with the N,N-dimethyl acetamide solvent (in which lithium chloride was previously dissolved) while in a closed zone at a temperature of about 230°C. The resulting solution is filtered to remove any residual solids.

The spinning solution while at a temperature of 25°C. is fed to spinneret having a single hole of 316 microns diameter and is extruded at a rate of 5 meters per minute into a circulating coagulation bath of tetrachloroethylene having a temperature of 25°C. which flows in the direction of the as-spun fiber. The resulting as-spun fiber is retained within the coagulation bath for a residence time of 15 seconds during which time a coagulated skin is formed upon the surface of the fiber while the core of the fiber is not coagulated and continues to retain a substantial quantity of the N,N-dimethyl acetamide solvent.

The resulting as-spun polybenzimidazole fiber is passed directly to a hot shoe provided at a temperature of 215°C. over which it is passed while in contact with the same for a residence time of 15 seconds. While in contact with the hot shoe, the as-spun polybenzimidazole fiber expands to a hollow tubular configuration.

The tubular fiber is chopped into a plurality of lengths having a longest dimension of about 0.5 inch. The lengths are provided in a random array on a support having upright edges. The configuration defined by the support and its upright edges corresponds to the configuration of the rectangular insulating panel which is ultimately to be produced.

The array or mat of tubular polybenzimidazole fibers is sprayed with a N,N-dimethyl acetamide bonding solvent provided at 25°C. The bonding solvent impinges upon and coats the fiber surfaces. The outer surface only of the polybenzimidazole fiber is solubilized by the bonding solvent. Excess bonding solvent is withdrawn as it collects upon the base of the support through openings provided therein.

The support together with the solvent coated fiber mat is next placed in a circulating air oven provided at 200°C. A substantial quantity of the bonding solvent volatilizes and is removed from the oven and the bonding of adjoining segments of polybenzimidazole fiber at point of contact occurs. The circulating air oven is maintained at 200°C. for 10 minutes, and is then gradually raised to 400°C. over a period of one hour.

The bonded product is next heated in a circulating air oven provided at 500°C. for 10 minutes during which time residual traces of volatile components such as the N,N-dimethyl acetamide spinning and bonding solvents are substantially expelled.

The resulting product is removed from the support and may be directly utilized as an insulative panel. A portion of the panel is illustrated in the drawing. The panel comprises a plurality of relatively short hollow segments of polybenzimidazole fiber which are bonded together at their points of contact. The panel is black in appearance, lightweight, high temperature resistant, and non-burning when heated in the flame of a microburner.

Although the invention has been described with preferred embodiments, it is to be understood that variations and modifications may be resorted to as will be apparent to those skilled in the art. Such variations and modifications are considered within the purview and scope of the claims appended hereto.

I claim:

1. A process for forming a high temperature resistant product comprising:
   a. providing a plurality of adjoining segments of hollow polybenzimidazole fiber,
   b. contacting said adjoining segments of hollow polybenzimidazole fiber with a solvent for said polybenzimidazole in a quantity sufficient to solubilize a portion of the fiber surface while maintaining the original hollow fibrous configuration of said segments essentially intact,
   c. evaporating a quantity of said solvent thereby bonding said adjoining segments of hollow polybenzimidazole fiber at points of contact, and
   d. heating the resulting bonded product to a temperature of at least 400°C. where it is maintained until volatile components thereof are substantially removed and cross-linking of molecules within the bonded polybenzimidazole product is promoted which renders the same insoluble in common polybenzimidazole solvents.

2. A process according to claim 1 wherein said polybenzimidazole consists essentially of recurring units of the formula:

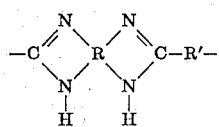

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

3. A process according to claim 1 wherein said polybenzimidazole is poly-2,2'-(m-phenylene)-5,5'-bibenzimidazole.

4. A process according to claim 1 wherein said solvent for said polybenzimidazole is selected from the group consisting of N,N-dimethyl formamide, N,N-dimethyl acetamide, dimethyl sulfoxide and N-methyl-2-pyrrolidone.

5. A process according to claim 4 wherein said solvent is N,N-dimethyl actamide.

6. A process according to claim 1 wherein step (c) is conducted by heating said adjoining segments of hollow polybenzimidazole fiber while in contact with said solvent for said polybenzimidazole at a temperature of about 200° to 300°C.

7. A process according to claim 1 wherein said resulting bonded product is heated in an oxygen-containing atmosphere to a temperature of at least 400°C.

8. A process according to claim 1 wherein said resulting bonded product is heated in an oxygen-containing atmosphere to a temperature of at least 500° C.

9. A process for forming a high temperature resistant product comprising:
   a. providing a spinning solution of a fiber-forming polybenzimidazole dissolved in a spinning solvent selected from the group consisting of N,N-dimethyl formamide, N,N-dimethyl acetamide, dimethyl sulfoxide, and N-methyl-2-pyrrolidone,
   b. extruding said solution into a coagulation bath which is a non-solvent for said polybenzimidazole and capable of coagulating the periphery of the resulting polybenzimidazole fiber,
   c. removing said resulting polybenzimidazole fiber from said coagulation bath following the coagulation of the periphery of said fiber while said fiber continues to maintain a substantial quantity of said solvent within the interior thereof,
   d. passing said fiber containing a substantial quantity of said solvent within the interior thereof through a heating zone capable of promoting the expansion thereof to form a hollow polybenzimidazole fiber,
   e. providing a plurality of adjoining segments of said hollow polybenzimidazole fiber,
   f. contacting said adjoining segments of hollow polybenzimidazole fiber with a bonding solvent for said polybenzimidazole provided in a quantity sufficient to solubilize a portion of the fiber surface while maintaining the original hollow fibrous configuration of said segments essentially intact,
   g. evaporating said bonding solvent thereby bonding said adjoining segments of hollow polybenzimidazole fiber at points of contact, and
   h. heating the resulting bonded product to a temperature of at least 400°C. where it is maintained until volatile components present therein are substantially removed and cross-linking of molecules within the bonded polybenzimidazole product is promoted which renders the same insoluble in common polybenzimidazole solvents.

10. A process according to claim 9 wherein said polybenzimidazole consists essentially of recurring units of the formula:

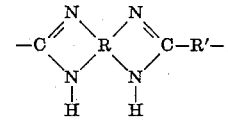

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furna, (d) quinoline, (e) thiophene, and (f) pyran.

11. A process according to claim 9 wherein said polybenzimidazole is poly-2,2'-(m-phenylene)-5,5'-bibenzimidazole.

12. A process according to claim 9 wherein said spinning solvent is N,N-dimethyl acetamide.

13. A process according to claim 9 wherein said plurality of adjoining segments of said hollow polybenzimidazole fiber comprise a mat of hollow fibers having lengths of about 0.1 to 1 inch.

14. A process according to claim 9 wherein said bonding solvent is selected from the group consisting of N,N-dimethyl formamide, N,N-dimethyl acetamide, dimethyl sulfoxide, and N-methyl-2-pyrrolidone.

15. A process according to claim 9 wherein said resulting bonded product is heated in an oxygen-containing atmosphere to a temperature of at least 400°C.

16. A process according to claim 9 wherein said resulting bonded product is heated in an oxygen-containing atmosphere to a temperature of at least 500°C.

* * * * *